United States Patent [19]

Okasaka et al.

[11] 4,073,827

[45] Feb. 14, 1978

[54] THERMOPLASTIC RESINOUS COMPOSITION

[75] Inventors: Hotsuma Okasaka, Nagoya; Kiyokazu Nakamura, Chiryu; Masanobu Morikawa, Nagoya; Kenji Tsunashima, Kyoto; Atsuhiko Soda, Otsu, all of Japan

[73] Assignee: Toray Industries, Inc., Tokyo, Japan

[21] Appl. No.: 656,080

[22] Filed: Feb. 6, 1976

[30] Foreign Application Priority Data

Feb. 10, 1975 Japan .................................. 50-16292

[51] Int. Cl.$^2$ ............................................. C08L 63/00
[52] U.S. Cl. ................................ 260/835; 260/830 P; 260/830 S; 260/836; 260/837 R; 428/413; 428/418; 428/458
[58] Field of Search ......................................... 260/835

[56] References Cited

U.S. PATENT DOCUMENTS

| | | | |
|---|---|---|---|
| 3,361,848 | 1/1968 | Siggel | 260/873 |
| 3,560,605 | 2/1971 | Siggel | 260/835 |
| 3,886,104 | 5/1975 | Borman | 260/835 |
| 3,909,485 | 9/1975 | Hongo | 260/835 |
| 4,020,122 | 4/1977 | Borman | 260/835 |

*Primary Examiner*—Paul Lieberman
*Attorney, Agent, or Firm*—Miller & Prestia

[57] ABSTRACT

A thermoplastic resinous composition comprising a blend of:
(a) 50-99 wt % of a polyester compound containing a dicarboxylic acid component, said dicarboxylic acid component to include at least 50 mol % terephthalic acid, and a glycol component including at least 50 mol % 1,4-butanediol;
(b) 50-1 wt % of α-olefine copolymer; wherein the weight percentages are based on the total weight of the polyester and α-olefine copolymer;
(c) 0.1-20 parts by weight of an epoxy compound having one or two epoxy groups attached to a molecule, the proportion of said epoxy compound to be based on the blend of the polyester and α-olefine copolymer.

This composition exhibits a desirable combination of bonding strength and processability, that makes it suitable for use in hot melt coatings and adhesives.

8 Claims, No Drawings

THERMOPLASTIC RESINOUS COMPOSITION

This invention relates to a thermoplastic resinous composition consisting of a blend of polyester, α-olefine copolymer and an epoxy compound, wherein the polyester comprises mainly polybutylene terephthalate and the epoxy compound has one or two epoxy groups attached to a molecule.

This invention further relates to a thermoplastic resinous composition that exhibits a desirable combination of bonding strength and processability so that the composition is suitable for use in hot melt adhesives and coatings. Preferably, this novel suitable for composition is suitable for use in hot melt adhesives and coatings on metal.

The coating of metallic surfaces with a resinous material has been conventionally used for insulating the metal or protecting the metal from corrosion. The resinous materials used in such conventional methods are mainly thermosetting resins such as epoxy or phenol, unsaturated polyester resins, and thermoplastic resins such as polyamides polyester or acrylics.

The conventional method, however, requires numerous steps and also necessitates the handling of a large amount of harmful organic solvent. To overcome these defects, hot-melt coating, wherein a thermoplastic resin is melt-adhered on a surface of metal without using any organic solvent, has recently become popular.

Thermosplastic resins comprised of polyester generally have excellent mechanical, heat resistant, anti-friction, anti-obliteration and electric insulating properties. Especially exhibiting such properties is a polyester that is mainly comprised of polybutylene terephthalate having melt viscosity and wetting properties that make it suitable for use as a high speed hot-melt coating. Furthermore, the polyester layer thus obtained forms a strong adhesive bond as soon as the coating cools, because the polyester has a high degree of crystallinity.

Blends of polybutylene terephthalate with polystyrene are used as hot-melt adhesives in U.S. Pat. No. 3,728,212. In this patent, high adhesive strength of the blend at a relatively high temperature was recognized, but descriptions relating to the blend's resistance to boiling water and autoclaving are entirely lacking. In fact, steel articles coated with a blend of polybutylene terephthalate and polystyrene have been found to lose their bonding strength after boiling water treatment. Resistance to the effects of boiling water and autoclaving is very important to resin coated metallic articles that are used as food containers, food packages, or kitchen wares. In these usages, the articles are usually treated in boiling water or in an autoclave for disinfective purposes or for cooking. It is important to prevent the corrosion of the contents during and after the boiling water treatment or autoclaving.

Resistance to the effect of hot water or high humidity is also important in conjunction with other substrates such as: cloth, film, footwears, books, and wood pieces. For example, polyamide or polyethylene powder is used to make fusible interlinings for clothing. These hot melt interlinings, however, lose their softness and bonding strength after hot water washing or steaming. Therefore, the resistance to washing or steaming of such fusible interlinings must be greatly improved.

Thus, an object of the present invention is to provide a thermoplastic resinous composition that has excellent adhesive strength and processability.

A further object of the present invention is to provide a thermoplastic resinous composition that has an enhanced resistance to the effects of hot water, autoclaving or steaming.

A more specific object of this invention is to provide an adhered or coated article containing the thermoplastic resinous layer and a substrate such as: metal, cloth, film, leather, or wood, that has an enhanced resistance to the harmful effects of hot water.

We have found, the foregoing objects are achieved by using a thermoplastic resinous composition comprising a blend of:

(a) 50–99 wt % of a polyester compound containing a dicarboxylic acid component, wherein said dicarboxylic acid component includes at least 50 mol % of terephthalic acid, and a glycol component, at least 50 mol % of said glycol component being 1,4-butanediol;

(b) 50–1 wt % of α-olefine copolymer; wherein the weight percentages are based on the total weight of the polyester and α-olefine copolymer; and (c) 0.1–20 parts by weight of an epoxy compound having one or two epoxy groups attached to a molecule, based on the blend of said polyester and α-olefine copolymer.

This product has excellent adhesive, anti-corrosive, and insulating properties when applied to metallic substrates. This product also exhibits excellent processability when it is applied as a hot melt adhesive.

This result is surprising, because a blend of the polyester and epoxy compound shows no resistance to the effects of boiling water or autoclaving, and has inferior properties and processability when it is used as a hot melt adhesive or coating. Further, it is surprising that the epoxy compound improves the compatibility of the polyester and α-olefine copolymer that, in turn, results in the improved adhesive strength and flow properties characteristic of the composition disclosed in this invention.

The thermoplastic polyester may have a main repeating unit of butylene terephthalate. At least 50 mol % of the dicarboxylic acid component of the polyester is terephthalic acid. Other dicarboxylic acids used as a co-monomer may be: (1) aliphatic dicarboxylic acids having from 2 to 20 carbon atoms, such as, azelaic, sebacic, adipic and dodecandicarboxylic acids, (2) aromatic dicarboxylic acids, such as, isophthalic acid, and naphthalenedicarboxylic acid, and (3) alicyclic dicarboxylic acids, such as cyclohexane dicarboxylic acid. At least 50 mol % of the diol component is 1,4-butanediol. Other diols used in this invention are saturated or unsaturated aliphatic, alicyclic, aromatic-aliphatic or heterocyclic glycols. This may be monomeric or polymeric. The examples of such glycols are: ethylene glycol, neopenthyl glycol, 1,6-hexandiol, propandiols, cyclohexan dimethanol, xylylenediglycol, 1,4-cyclohexan diol, polyethylene glycol and polytetramethylene glycol.

The polyester may preferably be a copolyester comprised of a dicarboxylic acid component containing of 50–95 mol % of terephthalic acid and 5–50 mol % of isophthalic acid, and a glycol component, at least 50 mol % of said glycol component being 1.4-butanediol. More preferably the glycol component may consist essentially of 1,4-butanediol.

The polyester may preferably have a relative viscosity of more than 1.2 measured by the standard method using 1.5g of polymer per 100 ml of orthochlorophenol at 25° C.

The α-olefine copolymer is a copolymer of α-olefine such as ethylene and propylene, and a vinyl monomer copolymerizable therewith. The vinyl monomer may be vinyl acetate, acrylic acid and its salts such as, zinc acrylate, calcium acrylate and sodium acrylate, acrylic esters such as lower alkyl acrylates, glycidyl acrylate, methacrylic acid and its derivatives, maleic acid, maleic anhydride etc. The content of these vinyl monomers in the α-olefin copolymer is usually 0.1 to 40 wt %, preferably 0.5 to 35 wt %.

The amount of α-olefine copolymer being blended with the polyester may be 1–50 wt %, based, preferably 5–40 wt % on the total weight of the polyester and α-olefine copolymer. When the amount of α-olefine copolymer is less than about 1%, the adhesive property of the composition is not improved, and the resin layer will peel off the substrate during a boiling water treatment. When the amount of α-olefin copolymer is more than 50% by weight, the mechanical and heat resistant properties, which the polyester resin originally has, are extremely deteriorated.

Preferably, the α-olefin copolymer is a α-olefine-vinyl acetate copolymer such as: ethylene-vinylacetate copolymer, propylene-vinylacetate copolymer, ethylene-propylene-vinylacetate copolymer, ethylene-acrylic acid-vinylacetate copolymer, and ethylene-glycidylmethacrylate-vinylacetate copolymer. Preferably ethylene-vinylacetate copolymer is used. The content of vinylacetate in the α-olefine-vinylacetate copolymer may be 10–40%, but preferably the content is 15–35% by weight. The α-olefine-vinyl acetate copolymer may be partially saponified and may be modified by graft-polymerization of a monomer such as acrylic acid and maleinic acid.

The epoxy compounds to be used in this invention are compounds having one or two epoxy groups attached to a molecule. The examples of such epoxy compounds are: β,γ-epoxypropylether; 1,2-bis (β,γ-epoxypropoxy) ethane; 1,3-bis (β,γ-epoxypropoxy) propane; 1,4-bis (β,γ-epoxypropoxy) butane; 1,6-bis (epoxyethyl) hexane; 2-hydroxy-1,3-bis (β, γ-epoxypropoxy) propane; 1,2-bis (β-methyl-β,γ-epoxypropoxy) ethane; 1,2-bis (α,β-epoxy-γ-methoxy) ethane; 2,2-bis [p-(β,γ-epoxypropoxy) phenyl] propane; 1-epoxyethyl-3,4-epoxy cyclohexane; 1-(β,γ-epxoypropoxy) -2-methoxyethane; 1-(β,γ-epoxypropoxy) -2-phenoxyethane; 1-(β,γ-epoxypropoxy)-2-benzyloxyethane; 1-(β,γ-epoxypropoxy)-2-ethoxyethane; 1-(β,γ-epoxypropoxy)-2- butoxyethoxy ethane; 1-(β,γ-epoxypropoxy)-2-butoxyethoxy ethane; and 1-(β,γ-epoxypropoxy)-2-phenoxyethoxy ethane.

Preferably, the epoxy compounds are glycidylpolyethers of 2,2-bis (4-hydroxyphenyl) propane, which can generally be prepared by a reaction of epichlorhydrine with 2,2-bis (4-hydroxyphenyl) propane in the presence of an alkali hydroxide. The glycidylpolyethers are preferably compounds having an epoxy equivalent weight of from 170 to 4000.

The amount of the epoxy compound being added to a blend of polyester and α-olefine-vinylacetate copolymer may be 0.1–20 parts, by weight preferably 0.5–15 parts by weight based on the blend of the polyester and α-olefine copolymer.

The blend of the polyester, α-olefine copolymer and the epoxy compound may be prepared conventionally. For example, pellets or powders of the three components may be melt-blended through a extruder. The α-olefine copolymer and epoxy compound may be added to the polymerization vessel of the polyester before or after the completion of polymerizaton. In some cases, the polyester, α-olefine copolymer and the epoxy compound may be dryblended in a form of powdered particles.

On applying this composition in film form, a polymer having a high degree of crystallinity or a high glass-transition temperature may be added to this composition in order to improve both the handling and surface properties of the film. Polyethylene terephthalate, polyethylene tere/isophthalate, polycarbonate, polyphenyleneoxide, polysulfone, polyamide, polyethylene, polypropylene, polystyrene, polymethylmethacrylate and polybutylene terephthalate are examples of polymers that may suitably be used.

Preferably, polyethylene terephthalate, polybutylene terephthalate (or copolymers of the above two), or polypropylene are the thermoplastic resins to be blended. The amount of such polymer to be added is 0.5 to 30 wt % based on the total weight of (a), (b) and (c).

Suitable substrates for use in the present invention are: metal, thermoplastic resins, film, cloth, wooden pieces, paper or leather. The metal may be either iron, steel, aluminum, chromium, copper, brass, bronze, nickel, zinc, titanium, or tin. Preferably, steel, aluminum, or copper is utilized. The cloth may be either knitted, woven, and non-woven, and made from either natural or synthetic fibers. Preferably, the thermoplastic resinous film to be used may be comprised of polyethylene terephthalate, poly-ε-caprolactam, polyhexamethylene adipate or polypropylene. The surface of the substrate may be cleaned and pretreated with other agents. Among such substrates, metal is most preferable.

The methods of adhering or coating the composition onto the substrate are not restricted. The composition may be extruded on the surface of the substrate before it is completely cooled and solidified. The composition may first be cast through an extruder to form a film or sheet then, the film or sheet may be fed onto the preheated surface to obtain a coated article. A powder coating of the composition may be applied to produce such a coated article also. Adhesive methods may also be employed in which the films or powders are placed between substrates, then heat and pressure is applied. The coated articles, as mentioned above, may be used for adhesion or lamination.

The resinous composition may also contain various additives such as stabilizers, plasticizers, UV-absorbers, fillers, pigments, and nucleating agents.

The resinous compositions of the present invention may be successfully employed in the: can, packaging, machinery, furniture, building-element, woodworking, apparel, footwear and bookbinding markets.

The following examples may further illustrate the present invention.

EXAMPLE 1

Polybutylene terephthalate is prepared by conventional procedures from terephthalic acid and 1,4-butandiol. The relative viscosity of the polyester is determined at 25° C using 0.5g of polymer per 100ml of OCP solution. The polyester (whose relative viscosity is 1.55) and poly-(ethylene-vinylacetate) (which contains 28% by weight of vinylacetate and has a melt index of 25 as determined by the ASTM-D1238 method), are mixed together in the weight ratio of 80 to 20. Various amounts of diglycidylpolyether of 2,2-bis-4-hydroxy phenyl propane (having a molecular weight of 900) are added to the polymer blend before extrusion. The amounts of the epoxy compound are described in Table 1. The mixtures are extruded at 250° C in a 60mm extruder and cast into an unoriented film with a thickness of 30 μ and a width of 300mm.

A steel plate is washed in trichloroethlene at 60° C for 1 hour to remove traces of protective oil. The plate is then dried in air. The steel plate is heated on a hot plate, whose temperature is 240° C. The film above obtained is placed on the steel plate and is pressed at 2kg/cm² for 5 sec. The coated steel plates are cut to give 10mm × 100mm specimens used for T-peel strength tests.

T-peel strength is measured by a "Tensilon" tensile tester by the general method of JIS-K6854 (in accordance with ASTM D-1876-69). The bonded specimens (prepared as described above) are heated in water in an autoclave at 140° C, for 120 min. After the heating period the specimens are cooled to 23° C and tested as described above. The results are summarized in Table 1, which illustrates the effect of the epoxy compound on the bonding strength.

A remarkable high T-peel strength is observed after a hot water treatment of the coated plate, when the mixture contains 0.1–20 parts of the epoxy compound.

Table 1

| Amounts of Epoxy Compound Parts to 100 parts of polymer blend | T-peel Strength (kg/cm) Initial | After hot-water treatment (140° C, 120min.) | Appearance of coating film after hot-water treatment |
|---|---|---|---|
| 0 | 4.5 | 0.2< | no good* |
| 0.1 | 6.0 | 1.1 | good |
| 3 | 6.8 | 2.2 | good |
| 10 | 7.3 | 2.5 | good |
| 15 | 7.8 | 3.3 | good |
| 20 | 8.1 | 1.5 | good |
| 25 | 8.2 | 0.5< | no good* |

*The film was released partialy.

EXAMPLE 2

Polyester is prepared from 1,4-butanediol, neopenthyl glycol and terephthalic acid, whose mole ratio of the glycols is 60 : 40. The polyester has a relative viscosity of 1.50 and melting point of 148° C. The polyester is blended with poly(ethylene-vinylacetate) which includes 40% by weight of vinylacetate and has a melt index of 15. The weight ratio of the polyester to poly-(ethylene-vinylacetate) is 70 to 30.

Seven parts of various epoxy compounds, which are described in Table 2, are added to the polymer blend. The mixtures are then extruded and cast into a 50 μ film at 260°–270° C.

The films are laminated under a pressure of 3kg/cm² on clean chrome-coated steel plates which have been pre-heated to 270° C.

The laminated chrome-coated steel specimens are prepared as described in example 1. The T-peel strengths at the initial stage and after the hot-water treatment are also measured. The results are given in Table 2.

Table 2

| Epoxy Compound | Amounts Parts to 100 Parts of polymer blend | T-peel Strength (kg/cm) Initial | After Boiling water treatment (140° C, 120min) |
|---|---|---|---|
| 1-(β,γ-epoxypropoxy)-2-benzyloxyethoxyethane | 7 | 5.5 | 1.2 |
| 1.2-bis(β,γ-epoxypropoxy)ethane | 7 | 7.9 | 2.3 |
| 1.4-bis(β,γ-epoxypropoxy)benzene | 7 | 7.7 | 2.1 |
| 1-epoxyetheyl-3,4-epoxycyclohexane | 7 | 6.3 | 1.9 |
| 2-ethyl.butyl 9.10-epoxystealate | 7 | 6.1 | 1.1 |
| bis(2,3-epoxybutyl)adipate | 7 | 5.3 | 1.2 |
|  | 0 | 4.4 | 0.2 |

Table 2 illustrates that the resistance to boiling water is improved by the addition of the epoxy compounds.

EXAMPLE 3

The copolyesters (having a relative viscosity of 1.48–1.50, wherein the terephthalic acid to isophthalic acid molar ratios are described in Table 3), are prepared conventionally. The copolyester and the poly-(ethylene-vinylacetate) (which includes 19 wt % of vinylacetate and has a melt index of 150) are mixed in a weight ratio of 88 to 12.

Two parts of diglycidylpolyether of 2,2-bis-4-hydroxy phenylpropane (having molecular weight of 700) are added to 100 parts of the polymer blends. The dry blend is then extruded and cast into a 50 μ film at 240°–270° C.

The bonded specimens are prepared as described in example 1. The T-peel strengths at both the initial stage and after a hot-water treatment are also measured. The results are shown in Table 3. Table 3 illustrates that the polyester composition having the best T-peel strength contains at least 50 mol % terephthalic acid based on the total acid component of polyester.

Table 3

| Mole Ratio of Isophthalic Acid to Terephthalic Acid in Polybutylene Tere/Isophthalate | T-peel Strength (kg/cc) Initial | After hot-water treatment | Appearance of Coated Film After hot-water treatment |
|---|---|---|---|
| 0/100 | 7.0 | 2.3 | excellent |
| 20/ 80 | 8.3 | 3.3 | excellent |
| 30/ 70 | 8.5 | 3.5 | excellent |
| 40/ 60 | 8.2 | 2.9 | good |
| 50/ 50 | 7.5 | 1.7 | good |
| 60/ 40 | 7.3 | 0.5 | no good* |

*The film was released and deformed.

EXAMPLE 4

Polybutylene terephthalate/isophthalate, wherein 65 mole percent of the dicarboxylic acid is terephthalic acid, is prepared. The copolyester has a relative viscosity of 1.55. Then, the copolyester is blended with poly-(ethylene-vinylacetate) (which includes 28 percent vinylacetate and has a melt index of 25) to give the desired blend as described in Table 4. Two parts of diglycidylpolyether of 2,2-bis-4-hydroxyphenyl propane (having a molecular weight of 350) are added to the polymer blend. The mixtures are melt-blended and case into a 40–45 μ film at 260°–270° C.

The bonded specimens are prepared on a hot plate that has been heated to 270°–280° C. Both the initial T-peel strengths and the T-peel strengths after hot-water treatment (taken at 130° C for 120 min.) of the specimens are measured as described in example 1. The results are shown in Table 4.

Table 4

| Composition of Coating Film | | T-peel Strength (kg/cc) | | Appearance of coated plate After hot-water treatment |
|---|---|---|---|---|
| Copolyester (wt %) | Poly-(ethylene-vinylacetate) (wt %) | Initial | After hot-water treatment (120° C, 60min) | |
| 100 | 0 | 3.2 | 0.5 | no good |
| 99 | 1 | 3.7 | 0.9 | good |
| 90 | 10 | 4.5 | 1.3 | excellent |
| 80 | 20 | 6.5 | 2.2 | excellent |
| 60 | 40 | 9.1 | 2.0 | excellent |
| 50 | 50 | 8.5 | 1.4 | good |
| 40 | 60 | 8.5 | 0.7 | no good |

Note that films containing more than 50 wt % ethylene-vinylacetate copolymer lost strength after the hot-water treatment.

EXAMPLE 5

Copolyesters are obtained from terephthalic acid, ethylene glycol and 1,4-butandiol, wherein the ethylene glycol to butandiol mole ratio is described in Table 5.

The copolyesters have relative viscosities of 1.43–1.45. Then, the copolyesters are mixed with poly-(ethylene-vinylacetate) (a copolymer of 60 weight percent ethylene and 40 weight percent vinylacetate that is grafted with 3 wt % of maleic anhydride based on the total weight of copolymer). Five parts of 1,3-bis($\beta,\gamma$-epoxypropoxy)-propane are added to 100 parts of the polymer blends.

The mixtures are then extruded and cast into 25–30 $\mu$ films at 260°–270° C. The laminated specimens are prepared as described in example 1. The T-peel strengths both at the initial stage, and after a hot-water treatment (120° C for 120 min.) are measured. The results are summarized in Table 5.

Table 5

| Mole ratio of ethylene glycol to butandiol in copolyester | T-peel Strength (kg/cc) | | Appearance of coated film after hot-water treatment |
|---|---|---|---|
| | Initial | After hot-water treatment | |
| 0 | 7.1 | 2.1 | excellent |
| 24 | 6.8 | 1.5 | excellent |
| 37 | 6.5 | 1.3 | good |
| 51 | 5.2 | 0.8 | good |
| 66 | 4.3 | 0.3 | no good* |

*The film was released and resulted in deformation.

When copolyesters containing higher mol % of ethylene glycol than butandiol are used, the bonded specimens are easily delaminated after the hot-water treatment.

EXAMPLE 6

The polybutylene terephthalate/azelate copolyester (having a relative viscosity of 1.48, wherein the terephthalic acid to azelaic acid mole ratio is 70 : 30) is prepared conventionally. Then, the copolyester and the partially saponified poly-(ethylenevinylacetate) (which includes 33% vinylacetate) are mixed in a weight ratio of 65 to 35.

Ten parts of diglycidylpolyether of 2,2-bis-4-hydroxy phenylpropane (having a molecular weight of 3750) are added to 100 parts of the polymer blend. The mixture is then extruded and cast into a 40 $\mu$ film at 260° C.

The adhesive tests are carried out with 12-mil aluminum plates, which are cut to a 10mm width and 100mm length for use in conjunction with the T-peel strength tests. The laminated specimen is prepared in the same method as described in example 1, except that a aluminum plate is used instead of a steel plate. The initial T-peel strength is 9.5 kg/cm and the bonding strength is retained even after treatment in an aqueous 5% salt solution at 120° C for a 120 min. time period. The laminated aluminum plate has a durable bonding for practical use, and also exhibits good corrosion resistance.

EXAMPLE 7

The film obtained in example 6 is placed between two 0.26mm plates of steel. After application of the film, the plates are clamped together by a pressure of 2kg/cm². Heat is applied by placing the clamped materials in an air oven at a temperature of 220° C. The initial T-Peel strength is 3.9kg/cm and the T-peel strength after hot-water treatment is 1.6kg/cm.

EXAMPLE 8

The film prepared in example 6 is used in this example. First, a chrome coated steel strip passes through a preheating furnace to bring its temperature up to 270° C. Then, the 30 $\mu$ film is fed onto the heated steel from reels. The film and the steel strip are pressed together between nip rolls. At this point, preadhesion of film to the steel strip occurs. The coated steel strip passes through a heating furnace where the temperature is kept at 270° C. The coated steel is rapidly cooled by passage through quenching rolls and a water bath, and then dried. Test pieces are prepared from the coated steel as mentioned in example 1. The T-peel strengths are measured both before and after the boiling water treatment in accordance with the method mentioned in example 1. The boiling water treatment lasts for 60 min. at 120° C. The resulting T-peel strengths are 4.5 and 1.6kg/cm respectively. The bonded specimen has an enhanced bonding strength, suitable for practical use and also exhibits good corrosion resistance.

EXAMPLE 9

Polyethylene terephthalate (having a relative viscosity of 0.61, a melting point of 260° C, and a glass-transition temperature of 69° C) is added to the composition of example 4, in order to improve the physical and handling properties of the film.

The mixture is comprised of the following composition.

| | |
|---|---|
| Polybutylene tere/isophthalate | 52.5% |
| Poly-(ethylene-vinylacetate) | 20 % |
| Epoxy compound | 7.5% |
| Polyethylene terephthalate | 20 % |

The mixture is (1) extruded at 285° C by using a 45mm extruder with an attached mixing-section (such as a "Static Mixer") (2) cast on a casting drum at a temperature of 45° C, followed by (3) take up on a roll, in the form of an unoriented film having a thickness of 20 μ and a width of 300mm. Both the productivity and handling of the film are remarkably improved as compared with the controlled films described in example 4. The physical and handling properties of the film are given in Table 6.

Table 6

| Properties of the film | Unit | This example |
| --- | --- | --- |
| T-peel strength *1) on polyester film | kg/cm | 2.1 |
| Youngs modulus *2) | kg/mm² | 130 |
| Friction coefficient *3) (static/dynamic) | | 0.9/0.6 |
| Blocking *4) | | 0 |
| Shrinkage *5) at 120° C for 30 min. | % | 0.01 |

*1) The film is placed between two 1.0 mill films of polyethylene terephthalate. The laminated structure is heat-sealed by a pressure of 1kg/cm², at a temperature of 260° C for 1 sec. The T-peel strength of the bonded films is measured as described in example 1.
*2) Youngs modulus is measured by the D882-67 method.
*3) Friction coefficient is measured by the method D1894-63.
*4) Two sheet of this film are overlapped upon each other. A 500g weight is placed over 12cm² of the overlapped films. The shearing stress is measured after the films have been aged at 40° C under 84% RH for 24hrs.
*5) Shrinkage is measured by the D1204-54.

EXAMPLE 10

The film prepared in example 6 is interposed between fabrics woven from a 65:35 blend of stable polyethylene terephthalate and cotton fibers.

The construction is heated at 180° C for 10 minutes under a pressure of 2kg/cm². The T-peel strength of the adhered fabrics is measured. The adhered fabric is then immersed in boiling water for 1 hour and the T-peel strength of the fabric is measured after drying. The results, shown in Table 7, illustrate that the bonding strength and softness of the fabric are retained, even after washing.

Table 7

| | Initial | After washing |
| --- | --- | --- |
| T-peel strength | 3.8kg/cm | 3.6kg/cm |
| Softness | good | good |

EXAMPLE 11

Polyester is prepared from 1,4-butanediol, terephthalic acid and isophthalic acid, wherein the mole ratio of the acids is 65 : 35. The polyester has a relative viscosity of 1145 and a melting point of 160° C. The polyester is blended with the various olefine-copolymers that are described in Table 8. The weight ratio of the polyester to the olefine-copolymers is 70 to 30.

Seven parts of diglycidyl polyether of 2,2-bis-4-hydroxy phenylpropane (having a molecular weight of 900) are added to 100 parts of the polymer blend. The blended composition is extruded and cast into a 50 μ film at a temperature of 250° C.

Then, the films are laminated on clean, chromate-treated steel plates that have been pre-heated to 250° C, at a pressure of 3 kg/cm².

The laminated, chromate-treated steel specimens are prepared as described in example 1. The T-peel strengths, bothat the initial stage and after the hot-water treatment, are also measured. The hot-water treatment is carried out at 140° C, for 90 min. The results are given in Table 8.

Table 8

| | T-peel Strength (kg/cm) | |
| --- | --- | --- |
| Olefine Copolymer | Initial | After Boiling water treatment (140° C, 90min.) |
| ethyleneacrylic acid | 5.5 | 1.1 |
| ethylene-Zn acrylate | 4.5 | 0.9 |
| ethylene-glycidylmethacrylate | 7.3 | 2.3 |
| propylene-maleic acid | 6.0 | 1.3 |
| ethylene-methylacrylate | 5.3 | 0.8 |
| polyethylene | 3.5 | 0.5< |
| polystyrene | 3.7 | 0.5< |

Table 8 illustrates that compared to both polyolefine and polystyrene, the olefine copolymers better resist the harmful effects of hot water.

What we claim is:

1. A thermoplastic resinous composition which comprises a blend of:
   (a) 50 to 99% wt % of a polyester comprising a dicarboxylic acid component, wherein at least 50 mol % of said dicarboxylic acid component is terephthalic acid, and a glycol component, wherein at least 50 mol % of said glycol component is 1,4-butanediol;
   (b) 50 to 1 wt % of α-olefin copolymer, wherein the weight percentages are based on the total weight of (a) and (b), said α-olefin copolymer being a copolymer of α-olefin selected from the group consisting of ethylene and propylene, in combination with at least one vinyl monomer selected from the group consisting of vinyl acetate acrylic acid, zinc acrylate, calcium acrylate, sodium acrylate, methyl acrylate, glycidyl acrylate, methacrylic acid, maleic acid, and maleic anhydride, and
   (c) 0.1 to 20 parts by weight on the basis of 100 parts by weight of (a) and (b) of an epoxy compound having one or two epoxy groups attached to a molecule.

2. A thermoplastic resinous composition as defined in claim 1, wherein said dicarboxylic acid component includes 50 to 95 mol % terephthalic acid and 5 to 50 mol % isophthalic acid, and said glycol component includes at least 50 mol % butanediol.

3. A thermoplastic resinous composition as defined in claim 2, wherein said glycol component consists essentially of 1,4-butanediol.

4. A thermoplastic resinous composition as defined in claim 1, wherein a content of said vinyl monomer unit in said α-olefine copolymer is 0.1 to 40 wt %.

5. A thermoplastic resinous composition as defined in claim 1, wherein said α-olefine copolymer is a α-olefine-vinylacetate copolymer selected from the group consisting of ethylenevinylacetate copolymer, propylene-vinylacetate copolymer, ethylene-propylene-vinylacetate, ethylene-acrylic acid-vinylacetate copolymer and ethylene-glycidylmethacrylate-vinylacetate copolymer.

6. A thermoplastic resinous composition as defined in claim 5 wherein said α-olefin-vinylacetate copolymer contains 10 to 40 wt % vinylacetate.

7. A thermoplastic resinous composition as defined in claim 1 wherein the amount of said epoxy compound is 0.5 to 15 parts by weight.

8. A thermoplastic resinous composition as defined in claim 1 wherein said composition further includes 0.5 to 30 wt % of a polymeric material selected from the group consisting of polyethylene terephthalate, polyethylene tere/isophthalate and polypropylene, said weight based on the total weight of (a), (b), and (c).

* * * * *